United States Patent [19]
Lindgren et al.

[11] Patent Number: 5,255,877
[45] Date of Patent: Oct. 26, 1993

[54] VARIABLE SPEED DROGUE

[75] Inventors: Matts Lindgren, Auburn; William L. Kirkland, Walnut, both of Calif.

[73] Assignee: West Coast Netting, Inc., Rancho Cucamonga, Calif.

[21] Appl. No.: 964,378

[22] Filed: Oct. 21, 1992

[51] Int. Cl.⁵ .............................................. B64D 37/00
[52] U.S. Cl. .................................. 244/135 A; 244/152
[58] Field of Search .............. 244/135 A, 135 R, 152; 141/1, 279, 388

[56] References Cited

U.S. PATENT DOCUMENTS

| | | | |
|---|---|---|---|
| 2,823,881 | 2/1958 | Patterson | 244/135 A |
| 2,946,543 | 7/1960 | Gordon et al. | 244/113 |
| 2,960,291 | 11/1960 | Patterson | 244/135 A |
| 2,998,949 | 9/1961 | Patterson | 244/135 A |
| 3,011,742 | 12/1961 | Gross | 244/113 |
| 3,067,972 | 12/1962 | Mosher | 244/135 A |
| 3,108,769 | 10/1963 | Hieber | 244/135 A |
| 4,927,099 | 5/1990 | Emerson et al. | 244/152 |

FOREIGN PATENT DOCUMENTS

0541505 10/1955 Belgium ........................... 244/135 A

Primary Examiner—Joseph F. Peters, Jr.
Assistant Examiner—Christopher P. Ellis
Attorney, Agent, or Firm—Fulwider Patton Lee & Utecht

[57] ABSTRACT

The variable speed drogue for use with an inflight aerial refueling system includes a refueling coupling for receiving a refueling probe. A plurality of trailing edge support arms are pivotally mounted to the trailing edge portion of the refueling coupling, projecting rearwardly, a plurality of pivot linkage members are pivotally connected to the trailing edge portion of the refueling coupling, and a plurality of leading edge support arms are pivotally connected to the pivot linkages. A mechanism is also provided for uniformly and symmetrically longitudinally changing the pivot points of the leading edge support arms to change the projected area of the drogue canopy.

16 Claims, 6 Drawing Sheets

VARIABLE SPEED DROGUE

BACKGROUND OF THE INVENTION

1. Field of the Invention

This invention relates generally to aerodynamic drogues for aerial inflight refueling, and more particularly concerns an improved drogue having adjustable support arms for a canopy to permit the configuration of the drogue to be modified in flight to be useful at different air speeds.

2. Description of Related Art

The development of drogues for inflight refueling of aircraft has been primarily directed by the need to stabilize a refueling hose trailing from a tanker aircraft in a generally horizontal attitude. The drogue provides drag for the refueling coupling, which must resist the forward movement of a probe from a refueling aircraft. Cone shaped drogues have proved to be suitable for low speed inflight refueling; however, it has been found that such drogues can become highly unstable at higher speeds, causing the refueling coupling device at the end of the refueling hose to become an oscillating, bobbing target, and occasionally causing the structure of the cone shaped drogue to collapse.

The high amount of drag provided by a drogue for low speed refueling also can cause the trail angle of the refueling hose and coupling to become flattened. It is desirable that the refueling aircraft not follow directly in the wake of the tanker aircraft, so that the configuration of a drogue which may be appropriate for low air speed refueling can be inappropriate for high speed refueling, even if the motion of the refueling coupling can be stabilized by aerodynamic designs.

It has therefore been a common practice to install either a low or high speed configuration drogue on the refueling coupling of a tanker aircraft on the ground, depending upon whether the aerial refueling is to take place at low or high speed, and to land to change the drogue to one of another speed configuration when an aircraft needs to be refueled at a different speed. Another approach has been to fabricate the ring shaped parachute canopy of the drogue of elastic material with openings which permit pressure modulation to provide for a constant amount of drag over varying speeds. However, such elastic openings have been found to be subject to deterioration, which can cause the amount of drag provided by the drogue to decrease over time, and can also cause an asymmetrical drag configuration to develop.

It has also been proposed to mount the ring shaped canopy to a spring assembly allowing for deflection of the canopy of the drogue to provide for a constant amount of drag, so that the drogue can be used at varying speeds. Such a spring mounting of the canopy at the trailing edge of the fuel coupling or support arms has also been found to be prone to damage from contact with a probe of a refueling aircraft, which can interfere with the drag configuration and stability of the drogue during the inflight refueling operation.

There is therefore a continuing need for a variable speed drogue which can be modified during flight or on the ground to have different drag configurations to allow the drogue to be used at high and low speeds, and which is not generally susceptible to deterioration or damage from a refueling probe. In order to safely control the amount of drag provided by the drogue, it would be desirable to be able to adjust the projected area of the canopy of the drogue in flight by a mechanism external to the fuel coupling for changing the angle of separation of support arms to which the canopy is attached. It would be also be desirable that the support arms be external to the fuel coupling, to be generally protected from potentially damaging contact with a refueling probe. Where the canopy is attached to a series of leading and trailing edge support arms, it would also be desirable to provide a mechanism for uniformly and symmetrically moving the pivot points of the leading edge support arms relative to the trailing edge support arms, to change the projected area of the canopy, and to consequently adjust amount of drag of the refueling drogue for operation at different speeds. It would further be desirable that the drag adjustment mechanism be operable remotely or manually, during flight or on the ground. The present invention fulfills these needs.

SUMMARY OF THE INVENTION

Briefly, and in general terms, the present invention provides for a variable speed drogue having a variable amount of drag provided by an adjustable area of projection of the drogue canopy, which can be set remotely or manually, during flight or on the ground, to provide the necessary amount of drag appropriate for different speeds of inflight refueling. A drag adjustment mechanism external to the refueling coupling is provided for uniformly changing the pivot points of leading edge support arms relative to trailing edge support arms, between which the canopy is attached. The drag adjustment mechanism can be operated during flight while the refueling coupling member is in a stowed position in a stowage tube, either mechanically, hydraulically, or electrically.

The invention provides for a variable speed drogue for use with an inflight aerial refueling system having a refueling coupling member for receiving a refueling probe. The variable speed drogue includes a plurality of trailing edge support arms pivotally mounted to the trailing edge portion of the refueling coupling member and projecting rearwardly from the refueling coupling member. A plurality of leading edge support arms also project rearwardly with respect to the refueling coupling member, pivotally mounted to the refueling coupling member at a plurality of pivot mounting points that are movable uniformly and symmetrically, along the longitudinal axis of the refueling coupling member. A drogue canopy, connected between the trailing ends of the leading and trailing edge support arms, presents a variable projected area, to provide an adjustable amount of drag. A mechanism is also provided for uniformly and symmetrically moving the pivot points of the leading edge support arms to change the projected area of the drogue canopy.

In a preferred embodiment, the mechanism for uniformly and symmetrically moving the pivot points of the leading edge support arms to change the projected area of the drogue canopy includes a sleeve external to the refueling coupling member mounted for longitudinal movement relative to the refueling coupling member. Latch means are connected to the sleeve and the refueling coupling member for setting the sleeve in any one of a plurality of positions in a forward or rearward longitudinal direction relative to the refueling coupling member. In a preferred aspect of the invention, positioning arm linkages are provided between the sleeve and leading edge support arms. Each positioning arm linkage has a forward end mounted to the sleeve and a pivot mounting means pivotally connected to the leading ends of the leading edge support arms, so that movement of the sleeve in a forward or rearward direction changes the projected area of the drogue canopy means. The sleeve preferably has a high drag, low speed position and a low drag, high speed position, although other intermediate speed settings of the sleeve may also be provided.

Means for moving the sleeve in a forward or rearward direction relative to the refueling coupling member are provided to set the sleeve in any one of the plurality of positions, and preferably includes a means in the aerial refueling system for latching the sleeve in a selected position.

These and other aspects and advantages of the invention will become apparent from the following detailed description, and the accompanying drawings, which illustrate by way of example the features of the invention.

DETAILED DESCRIPTION OF THE PREFERRED EMBODIMENTS

It has been found that the configuration of inflight refueling drogues for low and high speed refueling, is important to avoid oscillation and instability at high speeds, and to provide the proper trail angle for the flight speed during refueling. Landing for changing of the appropriate low or high speed configuration drogues on the ground between refueling of aircraft inflight at different speeds can be tedious and time consuming. Conventional parachute canopies with elastic openings and spring assemblies to provide for a constant amount of drag over varying speeds are subject to deterioration and damage by contact with a probe of a refueling aircraft, interfering with the drag configuration and stability of the drogue during the inflight refueling operation.

Figure 1:
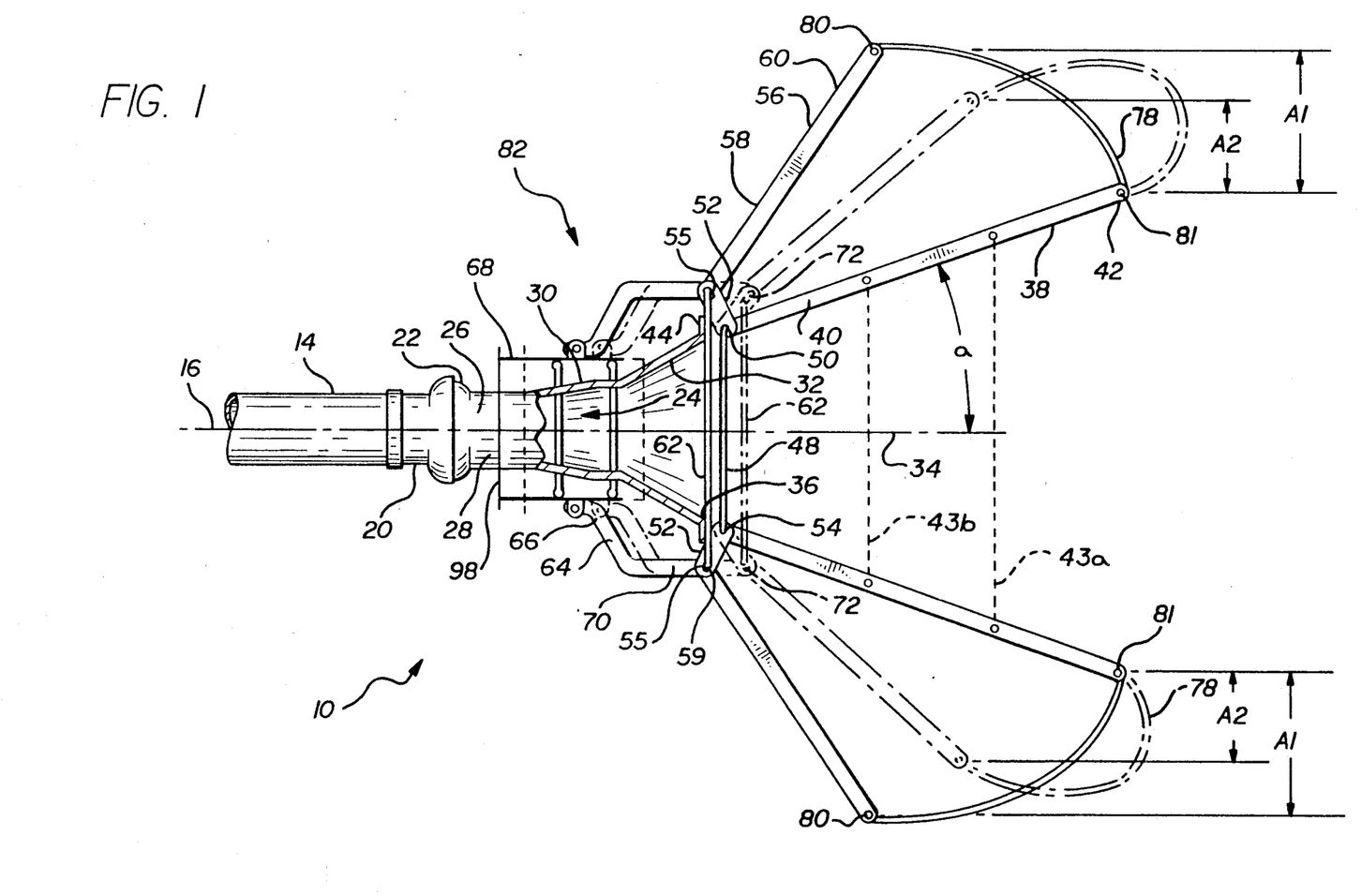
FIG. 1 is a sectional elevational view of a variable speed drogue for inflight refueling of aircraft according to the invention.
Figure 2:
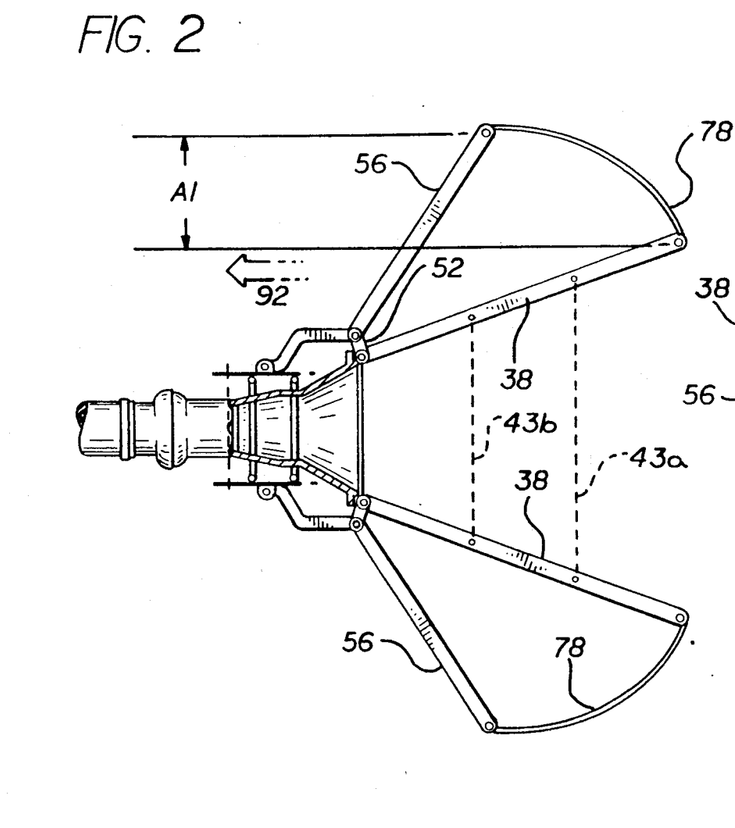
FIG. 2 is a sectional elevational view of the variable speed drogue of FIG. 1 in a high drag, low speed position depicting the projected area $A_1$ of the drogue canopy.

The invention accordingly provides for a variable speed drogue with a mechanism external to the refueling coupling, which is not generally susceptible to deterioration or damage from a refueling probe, and which can be modified during flight for different speed configurations. The invention is accordingly embodied in a variable speed drogue 10 for use with an inflight aerial refueling system. With reference to FIG. 1, the inflight aerial refueling system typically includes a fuel supply 12, such as a fuel tank in a tanker aircraft, an aircraft drogue stowage tube 13 which can be mounted in a wing pod or fuselage of a tanker aircraft for stowing the drogue, and a fuel line 14 that can be extended and retracted during flight for refueling other aircraft, that is connected for fluid communication with the fuel supply. The fuel line has a longitudinal axis 16, a leading end 18 connected to the tanker aircraft fuel supply, and a trailing end 20 connected to the forward end 22 of a refueling coupling member 24. The refueling coupling member is generally hollow and conical in shape, having a closed forward mating end portion 26 attached to the fuel line, a tubular intermediate section 28, a tapered intermediate throat section 30 flaring outward slightly to the rear of the tubular intermediate section for friction fit connection with a refueling probe (not shown) of an aircraft that is refueling, and a funnel shaped, tapered mouth portion 32 flaring outwardly at the rearward end of the refueling coupling member for receiving the refueling probe. The longitudinal axis of the fuel line is generally in line with the longitudinal axis 34 of the refueling coupling member where they are joined together.

As is illustrated in FIGS. 1-5, a plurality of trailing edge support arms 38 each having a leading end 40 and a trailing end 42 are pivotally mounted to the trailing edge portion 36 of the refueling coupling member, and are adapted to extend outwardly at an angle a with respect to the longitudinal axis of the refueling coupling member, limited in their outward extension by extension limiting means such as cables 43a and 43b connecting adjacent trailing edge support arms to each other at intermediate points along the length the trailing edge support arms.

In one preferred implementation of the invention, 36 trailing edge support arms are arrayed around the trailing edge of the refueling coupling member. The trailing edge portion of the refueling coupling member preferably includes a plurality of flanges 44 symmetrically arrayed around the trailing edge portion of the refueling coupling member, each of the flanges having an aperture 46 in which a first, inner pivot ring 48 is mounted. The leading ends of the trailing edge support arms include an aperture 50 through which the first pivot ring also extends, for pivotal mounting of the trailing edge support arms to the refueling coupling member.

A plurality of pivot linkages 52 each having a proximal aperture 54 and a distal elongated slot 55 are also pivotally mounted to the first pivot ring through their proximal apertures, allowing pivotal movement of the pivot linkages at the trailing edge of the refueling coupling member. A plurality of leading edge support arms 56, each having a leading end 58 with a proximal aperture 59 therethrough and a distal, trailing end 60, are pivotally connected to the distal ends of the pivot linkages by a second pivot ring 62 extending through the proximal apertures 59 of the leading edge support arms and the elongated slots 55 of the pivot linkages. In the preferred embodiment, where 36 trailing edge support arms are provided, 18 moveable leading edge support arms are provided, each of the moveable support arms being interspersed between two of the trailing edge support arms. The pivot points at the proximal apertures of the leading edge support arms are spaced apart from the trailing edge support arm by the length of the pivot linkages, which is typically about three inches.

A plurality of positioning arms 64 provide a linkage between the drag adjusting mechanism and the moveable leading edge support arms. The positioning arms each have a forward end 66 mounted to a moveable, generally tubular sleeve 68, covered by a conical, protective shroud 69 mounted to the forward end of the refueling coupling member, and a rearward end 70 with an aperture 72 therethrough connecting the positioning arms to the second, outer pivot ring 62. In the preferred embodiment, 18 positioning arms, corresponding to the number of moveable leading edge support arms, are connected to the outer, second pivot ring, for uniform and symmetrical longitudinal adjustment of the position of the pivot points of the leading edge support arms, as will be further described below.

Figure 3:
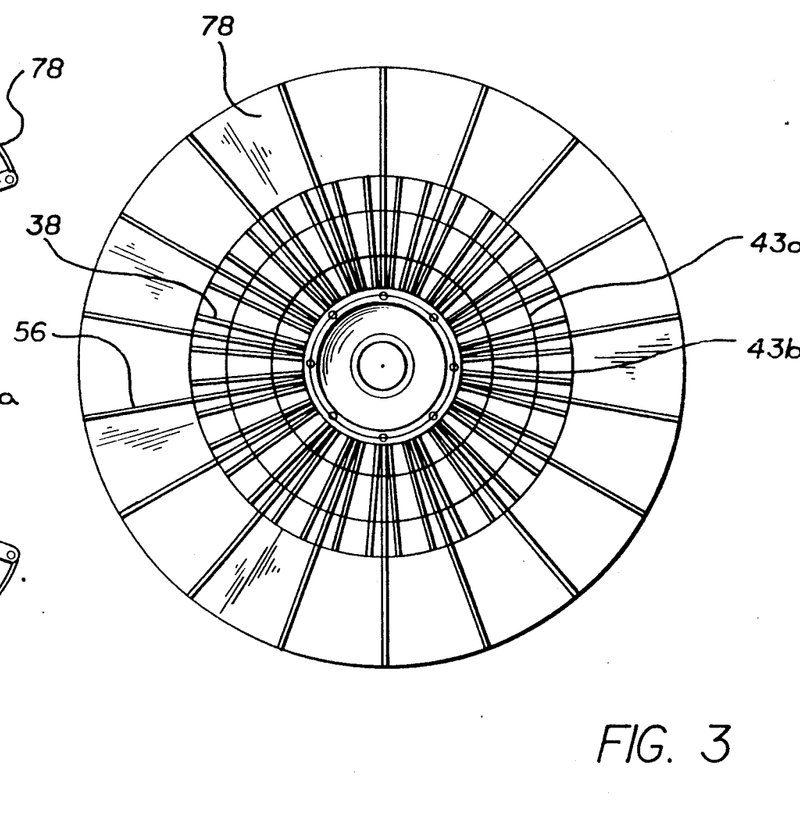
FIG. 3 is a rear view of the variable speed drogue in the high drag, low speed position shown in FIG. 2.
Figure 4:
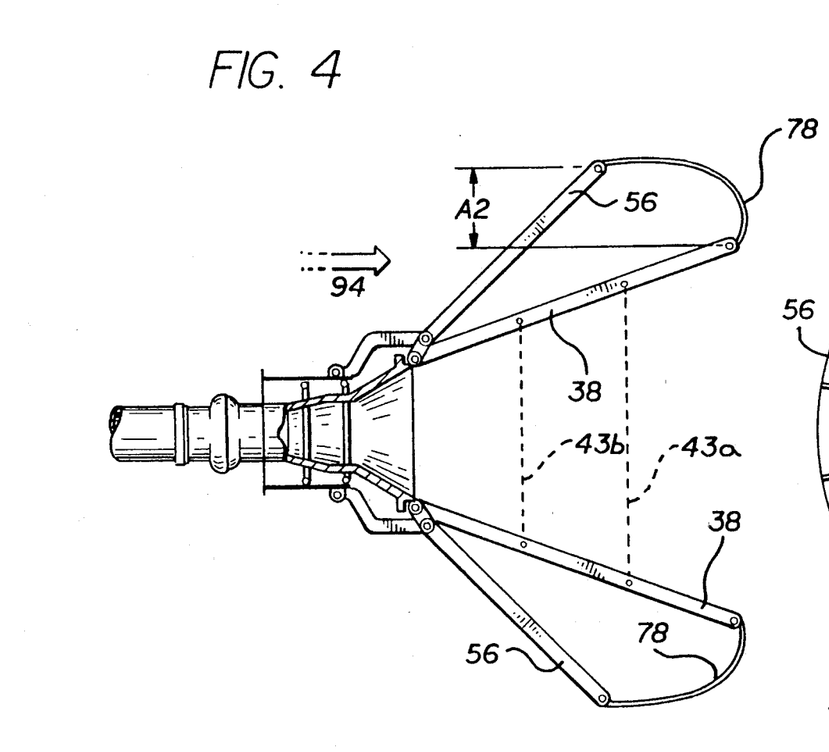
FIG. 4 is a sectional elevational view of the variable speed drogue of FIG. 1 in a low drag, high speed position depicting the projected area $A_2$ of the drogue canopy.
Figure 5:
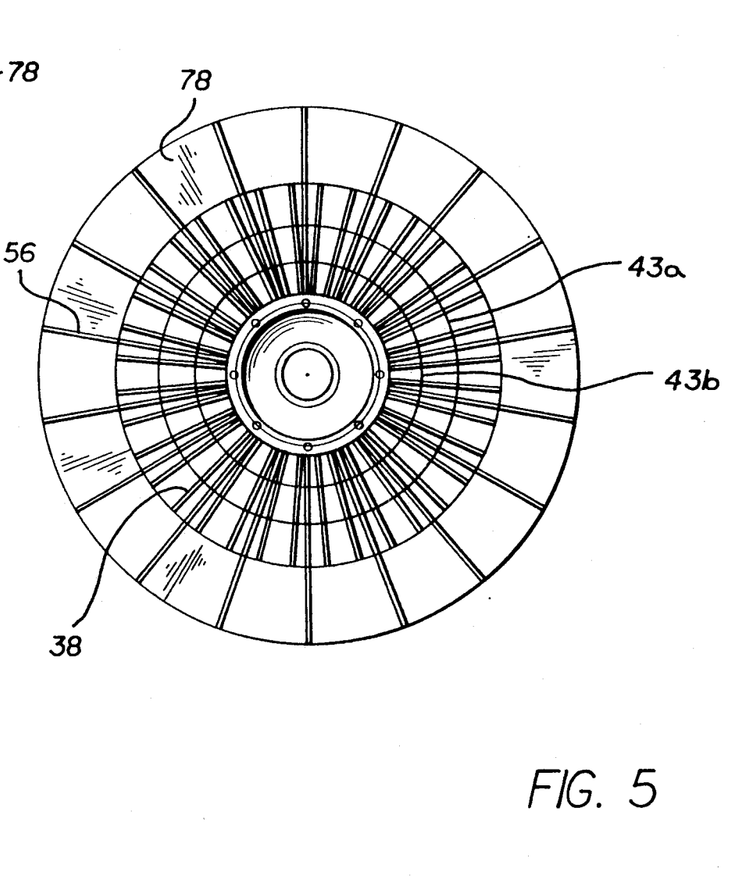
FIG. 5 is a rear view of the variable speed drogue in the low drag, high speed position shown in FIG. 4.

A drogue canopy member 78 is also preferably attached to the trailing ends of the leading edge support arms and the trailing end of the trailing edge support arms. As is best seen in FIGS. 3 and 5, the drogue canopy member preferably comprises a ring shaped parachute canopy of the drogue of material having a variable projected area depending upon the positioning of the leading edge support arms, to provide for an appropriate amount of drag force for varying refueling flight speeds. Typically, a drag force of approximately 1000 lbs. or less is desired at all operating speeds ranging from a low speed of 60 knots to a high speed of 300 knots or higher. The parachute canopy may for example be made from fabric, netting, webbing, or the like, and may be made of nylon, or similar materials, as are well known in the art. The trailing ends of the leading edge support arms preferably include apertures 80 for attaching the drogue canopy member, such as by a cord, cable, hooks or loops, or the like. The trailing ends of the trailing edge support arms similarly preferably include apertures 81 for attaching the drogue canopy member in the same fashion.

The canopy member preferably has a projected area extending between the trailing end of the leading edge support arm and the trailing end of the trailing edge support arm. By adjustment of the pivot point of the leading edge support arms forward or rearward about the longitudinal axis of the refueling coupling member, the projected area of the drogue canopy member between the trailing ends of the two sets of support members can thus be increased or decreased, respectively, to provide the desired amount of drag for refueling at various speeds. In a preferred embodiment, illustrated in FIG. 1-5, the moveable support arms can be adjusted between two positions, for example, one in a forward position having a larger projected area ($A_1$) for low speed refueling, and one in a rearward position having a smaller projected area ($A_2$) for high speed refueling.

The variable speed drogue thus also includes a support arm pivot adjustment means 82 for uniformly changing the pivot points of the leading edge support arms from said refueling coupling member to thereby change the projected area of the drogue canopy member. The pivot adjustment means includes the positioning arms 64 having forward ends 66 mounted to the moveable, generally tubular sleeve 68 surrounding the refueling coupling member. The rearward ends 70 of the positioning arms are pivotally connected to the outer, second pivot ring 62. The distal elongated slots 55 in the plurality of pivot linkages 52 permit the pivot linkages to rotate about their connection to the inner pivot ring 48 at the trailing edge of the refueling coupling member as the outer pivot ring 62 slides longitudinally along with the sleeve 68. The sleeve is mounted external to the refueling coupling member for movement relative thereto by a plurality of support rollers 86 each having a base portion 88 mounted externally on said refueling coupling member, and a bearing roller portion 90 adjacent to the inner tubular surface of the sleeve, to allow the sleeve to move smoothly and uniformly relative to the longitudinal axis of the refueling coupling member. In a preferred embodiment, the sleeve has at least two positions, a forward, low speed position 92, and a rearward, high speed position 94, although additional intermediate positions can also be provided, as desired.

Figures 6, 7:
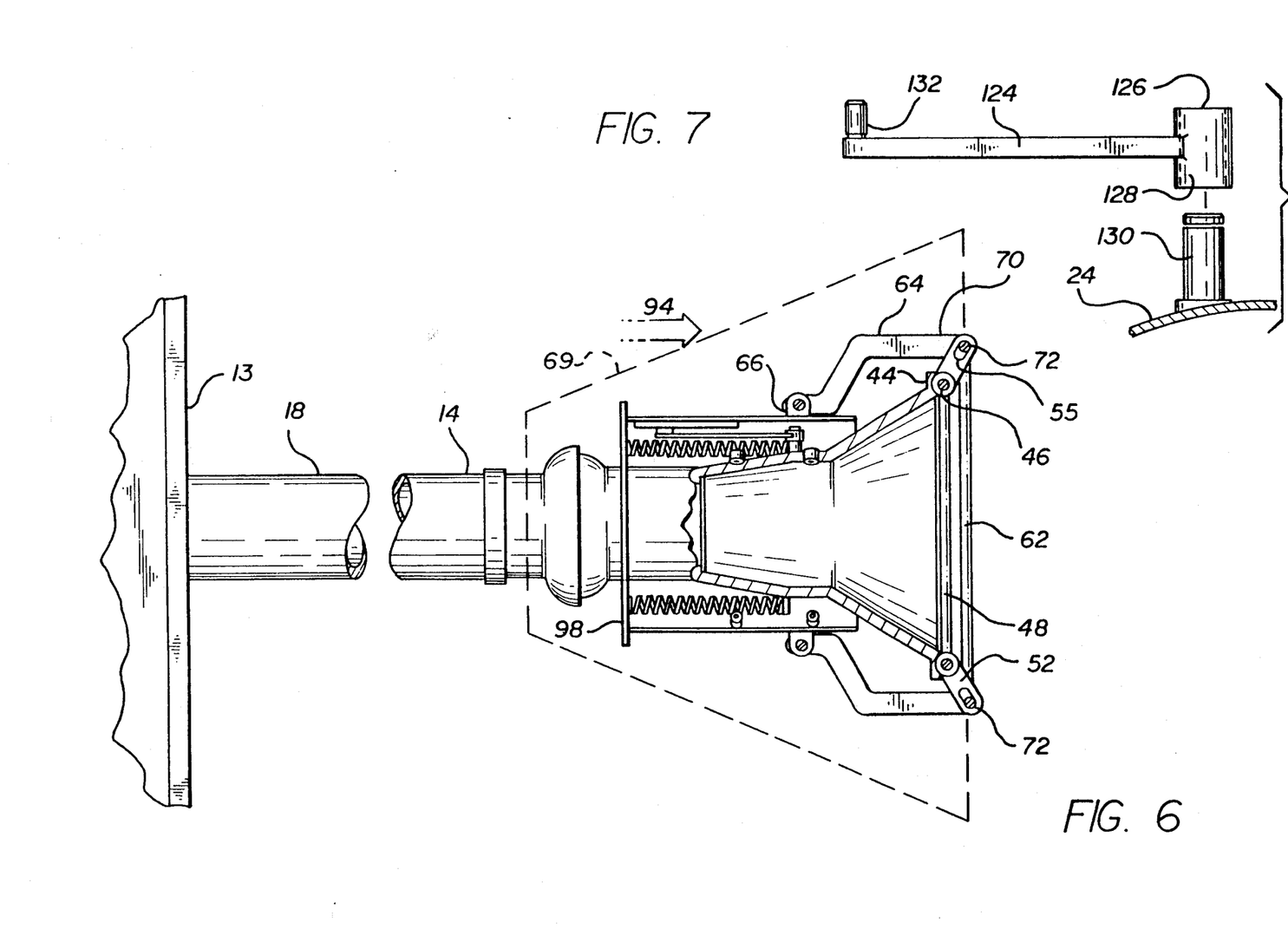
FIG. 6 is an enlarged, partial sectional elevational view of the variable speed drogue of FIG. 1.
FIG. 7 is an enlarged view of the latch bar and mount of a portion of the latch mechanism.
Figure 8:
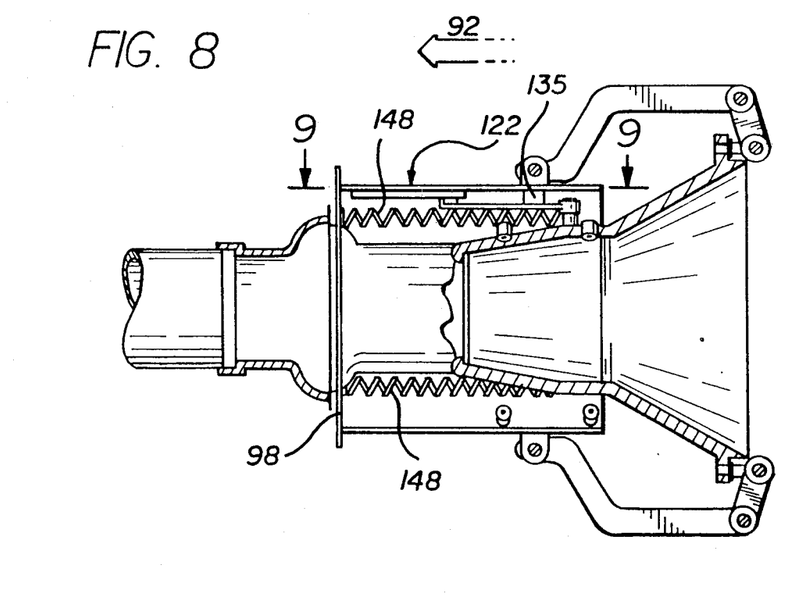
FIG. 8 is a sectional elevational view of the variable speed drogue of FIG. 1, illustrating the latch mechanism and an alternate actuator mechanism.
Figure 9:
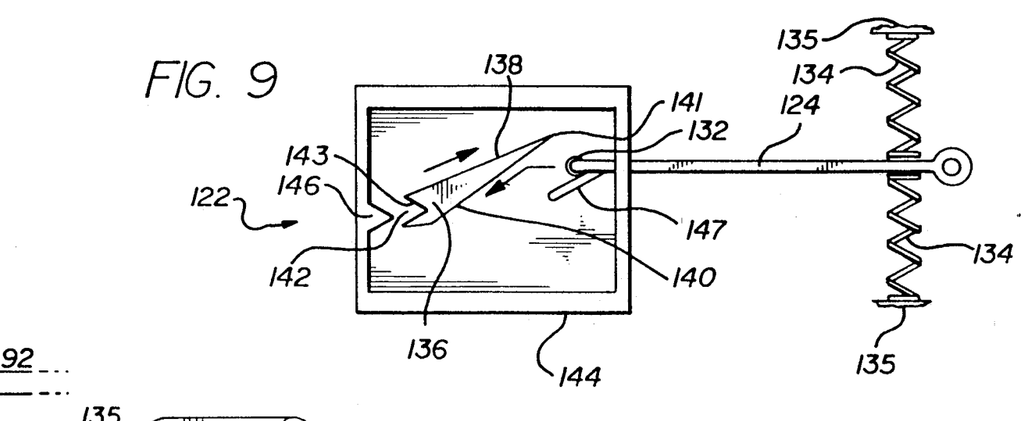
FIG. 9 is an enlarged top plan view of the latch mechanism, taken along line 9—9 of FIG. 8.
Figure 10:
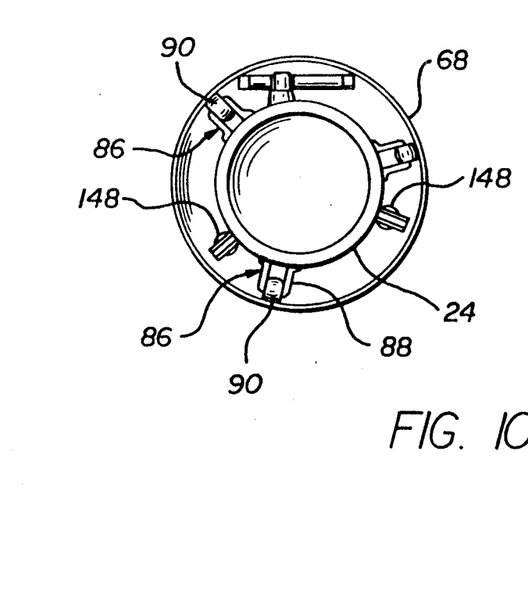
FIG. 10 is a cross-sectional view of the refueling coupling member and sleeve of the variable speed drogue as shown in FIG. 6.
Figure 11:
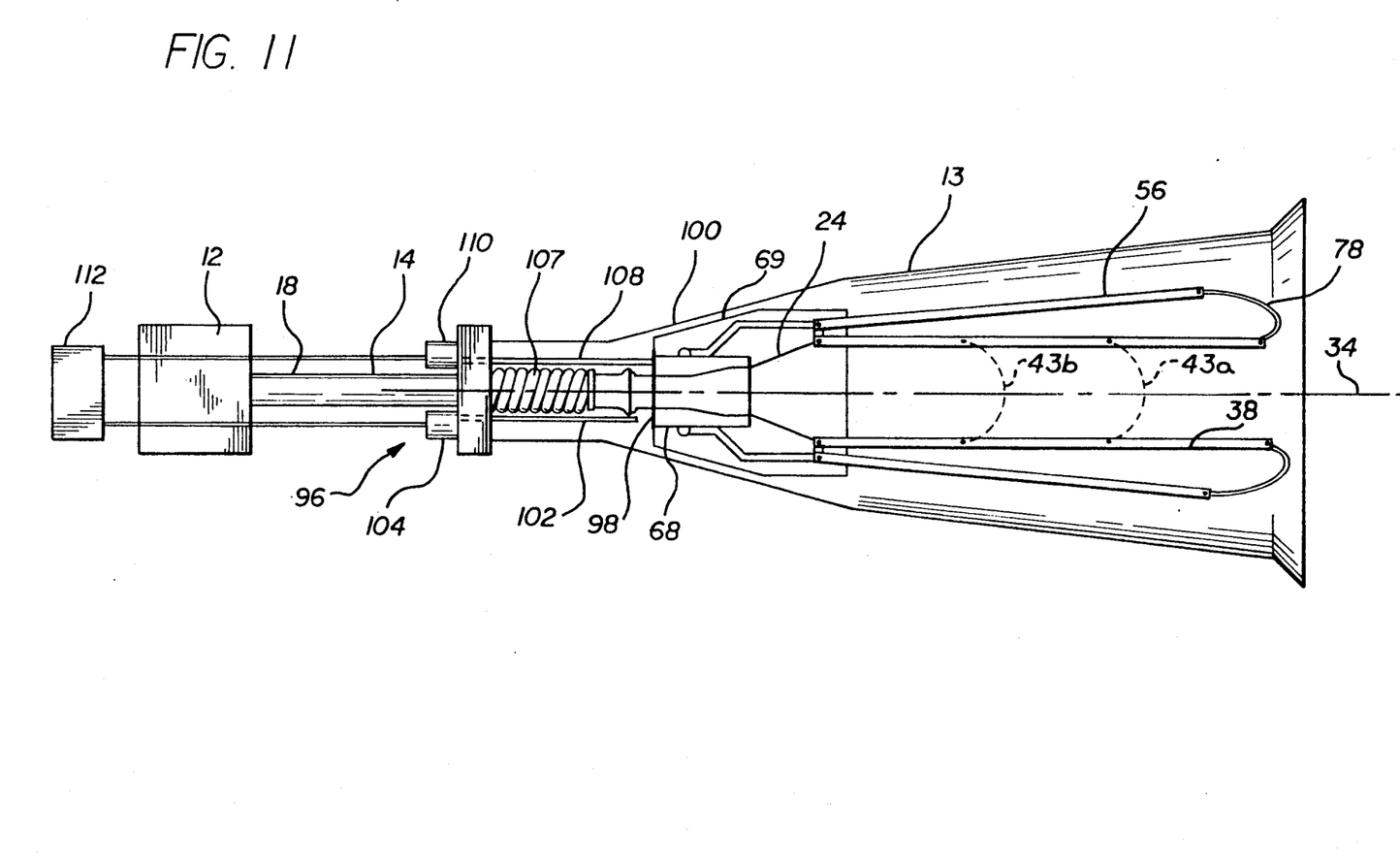
FIG. 11 is a cross-sectional view of the variable speed drogue of FIG. 1 stowed within a stowage tube.

In one preferred embodiment the variable speed drogue additionally comprises drag adjustment actuator means 96 for moving the sleeve 68 longitudinally in a forward or rearward direction with respect to the refueling coupling member. A preferred drag adjustment actuator means is shown in FIG. 11, mounted at the forward end 100 of stowage tube 13. The drag adjustment actuator means preferably includes an elongated drive rod 102 that can be extended toward a contact surface such as contact plate 98 attached to the forward end of the sleeve to push the sleeve into a desired position, and retracted. The drive rod is currently preferably driven longitudinally in a forward and rearward direction by electric drive means such as an electric motor 104, although the drive rod may be driven by other means such as a hydraulic system, provided at the forward end of the aircraft drogue stowage tube, mechanically, or manually, for adjusting the drogue position when the drogue is retracted and stowed in the stowage tube. The drag adjustment actuator means can thus push against the sleeve actuator contact plate 98, for moving the sleeve in a rearward direction and releasing the sleeve, to latch the sleeve in one of the desired drag configuration positions. It is also possible to operate the latch system of the invention by retraction of the fuel line by a typical fuel line retraction and extension system (not shown), so as to cause the sleeve contact surface to be pressed against a fixed limit stop bar (not shown) similar to the drive rod 102, preferably located at the forward end of the aircraft drogue stowage tube. A coil compression ejection spring 107 is disposed at the trailing end 20 of the fuel line, and is compressed against the limit stop by when the fuel line is fully retracted, to allow a quick expulsion of the variable speed drogue when released. The drag adjustment actuator means also preferably includes means for sensing the position of the sleeve with respect to the refueling coupling member, and in a currently preferred embodiment includes an elongated sense rod 108 that can be extended toward the contact plate 98 of the sleeve to make electrical contact with the contact plate, to complete an electrical sensing circuit providing a position signal to the control unit 112 for control of the drive rod for positioning of the leading edge support arms. The sense rod is currently preferably driven longitudinally in a forward and rearward direction by electric drive means such as an electric motor 110, although the sense rod may be driven by other means such as a hydraulic system, provided at the forward end of the aircraft drogue stowage tube The latch mechanism 122 as illustrated in FIG. 9 is preferably connected between the sleeve and the refueling coupling for adjustably fixing said sleeve in a plurality of positions in a forward or rearward direction with respect to the longitudinal axis of the refueling coupling member. In the preferred embodiment, the latch mechanism includes a latch bar 124, pivotally connected to the refueling coupling member by a pivot bushing 126, having an aperture 128 therein, at the trailing end of the latch bar, to a post 130 received in the aperture 128. The post is preferably mounted externally on the refueling coupling member, as can best be seen in FIG. 7. A detent roller or bearing 132 is mounted at the other end of the latch bar, and latch springs 134 mounted to inner flanges 135 on the sleeve are connected to an intermediate portion of the latch bar to bias the latch bar in a centered position, while allowing the latch bar to pivot as the detent roller encounters and interacts with a latch guide member 136 secured to the sleeve. The latch guide is preferably formed generally in the shape of a triangle positioned at an oblique angle with respect to the orientation of the latch bar, with a leading side 138 shown away from the latch bar, a trailing side 140 shown nearest to the latch bar, a narrow angle 141 shown adjacent to the latch bar, and at least one notch 142, in the leg 143 of the triangular guide member opposite the narrow angle. The guide member is mounted in a housing 144 secured to the sleeve. The housing also preferably contains at least one guide post 146 adjacent to the notch 142, and additional guide features such as guide block 147 on the leading side of the housing, to assist in guiding the roller of the latch bar into and out of the notch as the latch is operated. Biasing means, such as coil compression springs 148, which are preferably three in number, symmetrically arranged compression springs, are connected between the sleeve contact surface and the refueling guide member to bias the sleeve and guide member housing in a forward position, and to therefore bias the latch bar in a rearward position relative to the guide member, for placement of the leading edge drogue in a low speed configuration. From the position shown in FIG. 9, operation of the drive rod to move the sleeve and guide member housing rearwardly moves the latch roller along the trailing side of the guide member 140 into the guide notch, to latch the sleeve in a rearward, high speed position. Operation of the drive rod again moves the sleeve and guide member housing rearwardly to unlatch the latch roller out of the guide notch. When the drive rod is released, the compression springs bring the sleeve and guide member housing forward and the latch roller back along the leading side of the guide member 138, to finally rest against the guide block feature 147 with the sleeve in a forward, low speed position again.

It should be evident from the foregoing that the variable speed drogue of the invention can be modified during flight to have different speed configurations, by a mechanism external to the refueling coupling member which are thus generally protected from potentially damaging contact with a refueling probe form a refueling aircraft. It is significant that the variable speed refueling drogue is thus not generally susceptible to deterioration or damage from a refueling probe. It is also significant that the projected area of the canopy of the drogue can be adjusted by increasing or decreasing the projection of the leading edge support arms uniformly and symmetrically, to consequently change the drag of the refueling drogue for operation at different speeds. The drag adjustment mechanism can be operated by a mechanical, hydraulic, or electric drive, to allow the drag configuration to be adjusted remotely during flight, or can be operated by hand for ready reconfiguration on the ground or manual operation in flight.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A variable speed drogue for use with an inflight aerial refueling system, said system including a fuel supply; a fuel line having leading and trailing ends and being in fluid communication with said fuel supply; and refueling coupling means for receiving a refueling probe, said refueling coupling means having a longitudinal axis, a forward end and a rearward end, and a trailing edge portion at said rearward end, said refueling coupling means forward end being mounted to said trailing end of said fuel line; said variable speed drogue comprising:

a plurality of trailing edge support arms pivotally mounted to said trailing edge portion of said refueling coupling means;

pivot linkage means pivotally connected to said trailing edge portion of said refueling coupling means, and pivotally moveable between a first forward position and a second rearward position;

a plurality of leading edge support arms pivotally mounted to said pivot linkage means and spaced apart from said trailing edge portion of said refueling coupling means by said pivot linkage means, said plurality of leading edge support arms each having a leading end and a trailing end, each said leading end pivotally mounted at a pivot point to said pivot linkage means, each said pivot point being moveable uniformly and symmetrically, longitudinally between said first forward position and said second rearward position of said pivot linkage means by movement of said pivot linkage means;

drogue canopy means attached to said trailing end of said leading edge support arms and said trailing end of said trailing edge support arms, said drogue canopy means having a projected area extending between said trailing end of said leading edge support arm and said trailing end of said trailing edge support arm that is adjustable by movement of said pivot linkage means between said first and second positions; and means for uniformly and symmetrically moving said pivot linkage means between said first and second positions to adjust said projected area of said drogue canopy means for refueling at different speeds, said means for uniformly and symmetrically moving said pivot linkage means comprising a slide means mounted external to said refueling coupling means for longitudinal relative movement therewith between a forward position and a rearward position, positioning arm means connected between said slide means and said pivot linkage means for moving said pivot linkage means between said first forward position and said second rearward position, and latch means connected to said slide means and said refueling coupling means for adjustably fixing said slide means in said forward and rearward positions.

2. The variable speed drogue of claim 1, wherein said trailing edge support arms each have a leading end, and a trailing end projecting rearwardly from aid refueling coupling means and pivot outwardly at an angle limited by extension limiting means connecting said trailing edge support arms together at a point intermediate said leading and trailing ends of said trailing edge support arms.

3. The variable speed drogue of claim 1, further including means for moving said slide means in a forward or rearward direction to move said slide means between one of said forward and rearward positions.

4. The variable speed drogue of claim 1, further comprising actuator means for moving said slide means relative to said refueling coupling means about the longitudinal axis of said refueling coupling means.

5. The variable speed drogue of claim 1, wherein said slide means comprises a generally tubular sleeve member.

6. The variable speed drogue of claim 1, wherein said pivot linkage means is connected to said leading edge support arms by a pivot ring.

7. The variable speed drogue of claim 6, wherein said pivot linkage means comprises a plurality of elongated pivot linkage members having a first end pivotally connected to said trailing end of said refueling coupling member, and a second end having an elongated slot pivotally connected to said pivot ring.

8. The variable speed drogue of claim 4, further including means for biasing said slide means and said pivot linkage means in a forward direction.

9. A variable speed drogue for use with an inflight aerial refueling system, said system including a fuel supply; a fuel line having leading and trailing ends and being in fluid communication with said fuel s supply; and refueling coupling means for receiving a refueling probe, said refueling coupling means having a longitudinal axis, a forward end and a rearward end, and a trailing edge portion at said rearward end, said refueling coupling means forward end being mounted to said trailing end of said fuel line; said variable speed drogue comprising:

a plurality of trailing edge support arms pivotally mounted to said trailing edge portion of said refueling coupling means;

pivot linkage means pivotally connected to said trailing edge portion of said refueling coupling means, and pivotally moveable between a rearward position and a plurality of forward positions;

a plurality of leading edge support arms pivotally mounted to said pivot linkage means and spaced apart from said trailing edge portion of said refueling coupling means by said pivot linkage means, said plurality of leading edge support arms each having a leading end and a trailing end, each said leading end pivotally mounted at a pivot point to said pivot linkage means, each said pivot point being moveable uniformly and symmetrically, longitudinally between said rearward position and said plurality of forward positions of said pivot linkage means by movement of said pivot linkage means;

drogue canopy means attached to said trailing end of said leading edge support arms and said trailing end of said trailing edge support arms, said drogue canopy means having a projected area extending between said trailing end of said leading edge support arm and said trailing end of said trailing edge support arm that is adjustable by movement of said pivot linkage means between said rearward and plurality of forward positions; and means for uniformly and symmetrically moving said pivot linkage means between said rearward and plurality of forward positions to adjust said projected area of said drogue canopy means for refueling at different speeds, said means for uniformly and symmetrically moving said pivot linkage means comprising a slide means mounted external to said refueling coupling means for longitudinal relative movement therewith between said rearward position and said plurality of forward positions, positioning arm means connected between said slide means and said pivot linkage means for moving said pivot linkage between said rearward position and said plurality of forward positions, and latch means connected to said slide means and said refueling coupling means for adjustably fixing said slide means in said rearward and said plurality of forward positions.

10. The variable speed drogue of claim 9, wherein said trailing edge support arms each have a leading end, and a trailing end projecting rearwardly from said refueling coupling means and pivot outwardly at an angle limited by extension limiting means connecting said trailing edge support arms together at a point intermediate said leading and trailing ends of said trailing edge support arms.

11. The variable speed drogue of claim 9, further including means for moving said slide means in a forward or rearward direction to move said slide means between one of said forward and rearward positions.

12. The variable speed drogue of claim 9, further comprising actuator means for moving said slide means relative to said refueling coupling means about the longitudinal axis of said refueling coupling means.

13. The variable speed drogue of claim 9, wherein said slide means comprises a generally tubular sleeve member.

14. The variable speed drogue of claim 9, wherein said pivot linkage means is connected to said leading edge support arms by a pivot ring.

15. The variable speed drogue of claim 14, wherein said pivot linkage means comprises a plurality of elongated pivot linkage members having a first end pivotally connected to said trailing end of said refueling coupling member, and a second end having an elongated slot pivotally connected to said pivot ring.

16. The variable speed drogue of claim 12, further including means for biasing said slide means and said pivot linkage means in a forward direction.

* * * * *

UNITED STATES PATENT AND TRADEMARK OFFICE
CERTIFICATE OF CORRECTION

PATENT NO. : 5,255,877

DATED : October 26, 1993

INVENTOR(S) : Matts Lindgren, William L. Kirkland

It is certified that error appears in the above-identified patent and that said Letters Patent is hereby corrected as shown below:

At Column 4, line 39, underscore "a".

At Column 7, line 4, insert period after "tube".

Claim 2, Column 9, line 7, change "aid" to "said".

Claim 9, Column 9, line 39, delete "s" before "supply;".

Signed and Sealed this

Thirtieth Day of August, 1994

Attest:

BRUCE LEHMAN

Attesting Officer

Commissioner of Patents and Trademarks